March 31, 1959     B. D. FOSTER ET AL     2,879,761
BARBECUE GRILL GRATE
Filed April 15, 1954
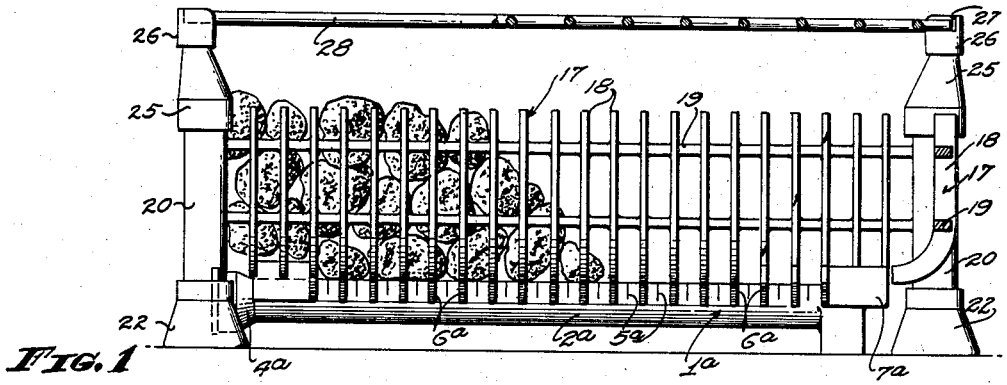
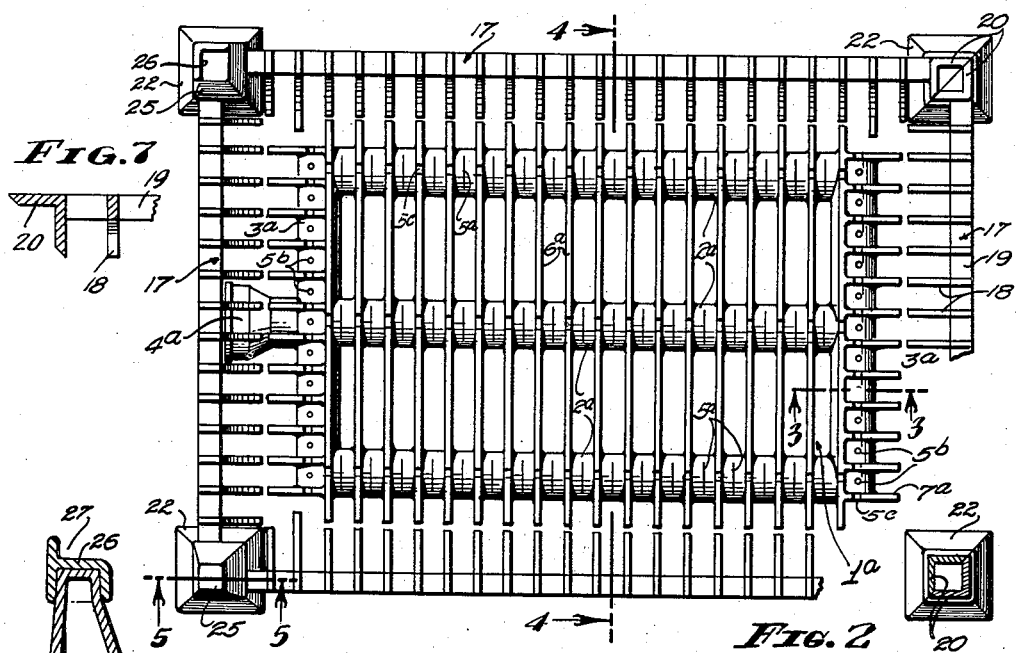
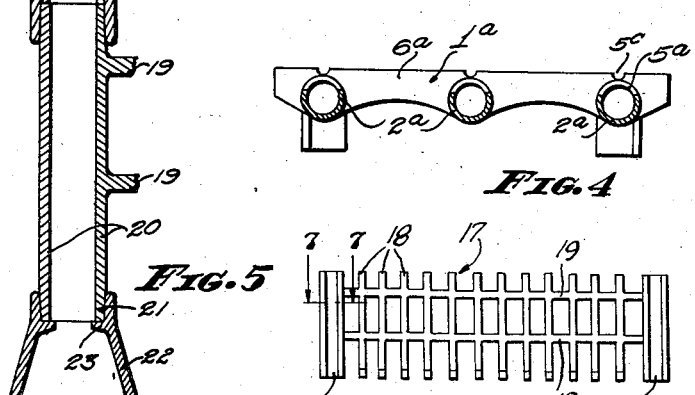
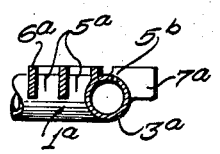
BERTRAM D. FOSTER
EDWARD J. McCABE Jr
INVENTORS.
BY
ATTORNEYS

United States Patent Office 2,879,761
Patented Mar. 31, 1959

2,879,761

BARBECUE GRILL GRATE

Bertram D. Foster, Montebello, and Edward J. McCabe, Jr., Rivera, Calif., assignors to M. Samuel Shapiro, Montebello, Calif.

Application April 15, 1954, Serial No. 423,406

1 Claim. (Cl. 126—40)

Our invention relates to barbecue grill grates, and included in the objects of our invention are:

First, to provide a barbecue grill grate wherein a gas burner structure is incorporated as an integral part of the grate.

Second, to provide a barbecue grill grate wherein all the essential parts may be iron castings so arranged as to be assembled with a minimum of finishing operations.

Third, to provide a grill grate which is particularly adapted to facilitate the use of volcanic cinders or analogous material capable of being heated to a red glow without deterioration.

Other objects and advantages of our invention will be apparent from the following detailed description of a preferred embodiment thereof as illustrated in the accompanying drawings, in which:

Figure 1 is a side view of our barbecue grill grate with a portion broken away and in section;

Figure 2 is a top or plan view thereof, with a portion broken away and in sections;

Figure 3 is a fragmentary sectional view through 3—3 of Figure 2;

Figure 4 is a fragmentary sectional view through 4—4 of Figure 2, showing the burner unit only;

Figure 5 is an enlarged sectional view through 5—5 of Figure 2, showing the corner post construction;

Figure 6 is a reduced elevational view of one of the side frames as viewed from the inner side thereof; and Figure 7 is an enlarged, fragmentary, sectional view through 7—7 of Figure 6.

Our barbecue grill grate includes a burner unit 1a of generally rectangular form and is provided with three tubular longitudinal elements 2a, the ends of which are connected by tubular cross elements 3a. A suitable supply and mixer port 4a extends from the central portion of one of the cross elements 3a. Each tubular longitudinal element 2a of the burner 1a is essentially circular in cross section and is provided with a series of burner slits 5a therein. The cross elements 3a are also circular in cross section and provided with burner ports 5b.

The longitudinal elements 2a of the burner unit 1a are joined by integral transversely extending grate bars 6a located between the burner slits 5a. The end grate bars adjacent the cross elements 3a of the burner unit 1a are provided with end projections 7a. The corners of the burner unit 1a are provided with short supporting posts 1b. The burner unit 1a comprising the longitudinal elements 2a, cross elements 3a, and grate bars 6a and 7a constitute a single casting, preferably formed of iron or aluminum.

The burner unit 1a is surrounded by a rectangular frame structure comprising four side frames 17 of appropriate length. Each side frame 17 comprises a plurality of vertical bars 18 joined by horizontal cross bars 19. The extremities of the cross bars 19 are joined to corner post elements 20. The lower ends of the vertical bars are curved inward, and preferably terminate contiguous to and in alignment with the grate bars 6a and 7a.

Each corner post element 20 is in the form of an angle member with its extremities beveled so that a pair of corner post elements of the adjacent side frames may be brought into complementary relation to form a hollow corner post of square cross section. Each side frame 17 with its vertical bars 18, cross bars 19, and corner post elements 20 is a single casting.

The pairs of corner post elements 20, forming each corner of the frame structure, are adapted to seat within a socket 21 formed in the upper end of a hollow pedestal 22. Stop shoulders 23 limit insertion of the corner post elements. The upper extremity of each complementary pair of corner post elements receives a hollow cap 24, also provided with stop shoulders 25. If it is desired to employ the structure as a barbecue grate, the caps 24 may receive secondary caps 26 having notches or recesses 27 to support the corners of a grill 28, shown in Figure 5 of the drawings. The burner unit 1a is covered with volcanic cinders 16.

It should be observed that the grate bars do not extend appreciably above the burners, so that the grate bars are clear of the flame region above the burner openings. Consequently, the grate bars do not become over-heated and thus do not deteriorate. The volcanic cinders being light and porous, and being formed essentially of refractory material, do not conduct any appreciable heat to the grate bars even when portions become heated by the flame issuing from the burners.

In order to operate the barbecue grill grate, it is merely a matter of igniting the gas issuing from the burner ports 5a. The resulting flame heats the volcanic cinders 16 so that they become radiant, and provide the heating means for the cooking of food stuff placed on the grill or otherwise suitably supported thereabove. It is, of course, possible to utilize charcoal or other material and merely employ the burner to intiate and sustain coals thus produced. However, it is preferred to use a refractory material, such as volcanic cinders, that is, a material which will not be consumed by the heat, but will convert the gas flame into the radiant energy typical of glowing charcoal.

Having fully described our invention, it is to be understood that we do not wish to be limited to the details herein set forth, but our invention is of the full scope of the appended claim.

We claim:

A grate structure, comprising: a single-piece burner unit, including a plurality of flat, parallel grate bars disposed edgewise, a plurality of parallel burner tubes extending perpendicularly to and through said grate and joined integrally therewith, a manifold means integral with said tubes for connecting said tubes with a source of gaseous fuel, and burner orifices disposed between said grate bars, said orifices being located below the top edges of said grate bars a distance less than the spacing of said grate bars thereby to dispose the grate bars clear of flame issuing from said burner orifices, said grate bars having flame-propagating notches therein between said burner orifices; a multiplicity of irregularly-shaped refractory members disposed on said grate bars; and a frame unit surrounding said burner unit, including side wall members, each having vertical bars inturned at their lower ends to confront the ends of said grate bars, horizontal rails integrally joining said bars, and post elements at the extremities of said rails, said post elements adapted to be disposed in complementary pairs at the corners of said frame unit, and pedestal and cap means arranged to receive the lower and upper ends of said post elements to secure said side wall members together, said side wall members of said frame unit cooperating with said grate bars to retain said refractory members on said grate structure.

References Cited in the file of this patent

UNITED STATES PATENTS

| | | |
|---|---|---|
| 329,172 | Jarboe | Oct. 27, 1885 |
| 380,732 | Smith et al. | Apr. 10, 1888 |
| 526,973 | Keller | Oct. 2, 1894 |
| 565,050 | Thiele | Aug. 4, 1896 |
| 746,890 | Smith | Dec. 15, 1903 |
| 1,501,631 | Taylor | July 15, 1924 |
| 2,201,501 | Poschadel | May 21, 1940 |
| 2,318,985 | Baker | May 11, 1943 |
| 2,519,482 | Kutchera | Aug. 22, 1950 |
| 2,790,434 | Del Francia | Apr. 30, 1957 |

FOREIGN PATENTS

| | | |
|---|---|---|
| 64,146 | Netherlands | Sept. 15, 1949 |
| 92,288 | Switzerland | Dec. 16, 1921 |